Figure 1:
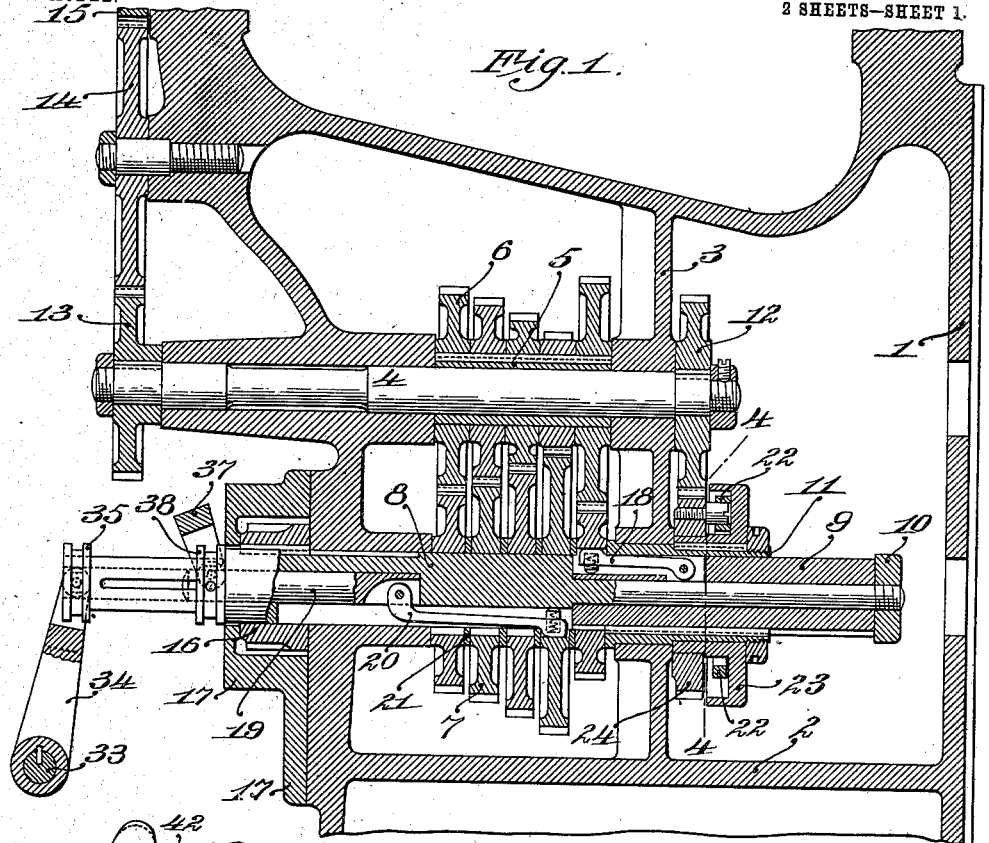

No. 734,838. PATENTED JULY 28, 1903.
J. EDGAR.
CHANGE FEED MECHANISM.
APPLICATION FILED OCT. 28, 1902.
NO MODEL. 2 SHEETS—SHEET 1.

Witnesses
Alfred H. Hildreth
Edward S. Day

Inventor
John Edgar
by his attorneys
Phillips Van Everen & Fish

No. 734,838. PATENTED JULY 28, 1903.
J. EDGAR.
CHANGE FEED MECHANISM.
APPLICATION FILED OCT. 29, 1902.
NO MODEL. 2 SHEETS—SHEET 2.

Witnesses
Alfred H. Hildreth
Edward S. Day

Inventor
John Edgar
by his attorneys
Phillips Van Everen & Fish

No. 734,838. Patented July 28, 1903.

UNITED STATES PATENT OFFICE.

JOHN EDGAR, OF HYDEPARK, MASSACHUSETTS, ASSIGNOR TO BECKER-BRAINARD MILLING MACHINE COMPANY, OF PORTLAND, MAINE, A CORPORATION OF MAINE.

CHANGE-FEED MECHANISM.

SPECIFICATION forming part of Letters Patent No. 734,838, dated July 28, 1903.

Application filed October 29, 1902. Serial No. 129,239. (No model.)

*To all whom it may concern:*

Be it known that I, JOHN EDGAR, a subject of the King of Great Britain and Ireland, residing at Hydepark, in the county of Norfolk and State of Massachusetts, have invented certain new and useful Improvements in Change-Feed Mechanisms; and I do hereby declare the following to be a full, clear, and exact description of the invention, such as will enable others skilled in the art to which it appertains to make and use the same.

The present invention relates to an improved change-feed mechanism particularly designed for use in connection with horizontal or vertical milling-machines, but which is also adapted for use in connection with other types of machine-tools or in other relations.

The invention is intended primarily as an improvement on the change-feed mechanism disclosed in my pending application, Serial No. 96,917, filed March 6, 1902; but it is to be understood that except as specifically defined in the claims the invention is not limited to the form of change-feed mechanism disclosed in said application, nor is it limited to the specific constructions and arrangements of parts illustrated in the drawings accompanying this application and hereinafter specifically described.

One of the objects of my invention is to provide a change-feed mechanism having provision for preventing shocks or jars when a change is made from one speed to another, whereby the various parts of the change-speed gearing connecting the driving and driven members are relieved of injurious strains and are at the same time rendered more certain and reliable in operation.

Another object of my invention is to improve the indicating devices of change-feed mechanisms comprising two hand-operated members and intermediate connections for actuating the devices which connect the gears of the change-speed gearing to the driving and driven members.

With these objects in view my invention contemplates providing a cushioning-spring connection in the mechanism for actuating the driving member of the change-feed mechanism or in the mechanism which is actuated by the driven member, which spring connection is arranged to impart an independent rotary movement to the driven member or to the driving member when these members are disconnected from each other in changing from one speed to another. By providing such a cushioning-spring connection the power which is transmitted by the change-speed gearing is applied thereto gradually and the shock or jar which would otherwise be occasioned at the moment when the driving and driven members are connected is absorbed and no sudden strain is brought upon the various parts of the change-speed gearing; also, the devices which connect the gears of the change-speed gearing to the driving and driven members are allowed to act before the change-speed gearing begins to transmit the full power applied thereto, and thereby such devices are rendered more certain and reliable in their operation.

While my invention, broadly considered, contemplates providing a cushioning-spring connection either in the mechanism which actuates the driving member or in the mechanism which is actuated by the driven member, I consider it preferable to locate the cushioning-spring connection in the mechanism for actuating the driving member, as thereby the gears of the change-speed gearing are not started into operation suddenly and better results are secured than when the cushioning-spring connection is located in the mechanism which is actuated by the driven member. In its preferred form the cushioning-spring connection is arranged between two members having a limited rotary movement independent of each other and adapted to positively engage at the limit of such movement, the tension of the spring being such that the members are allowed to come into engagement and positively transmit the power applied to the machine. It is sometimes desirable to reverse the direction of rotation of the driving member of the change-feed mechanism, and for this reason the cushioning-spring connection between the two independently-rotatable members is preferably arranged to be put under tension when one member is rotated with relation to the other in either direction.

My invention also contemplates providing a change-feed mechanism comprising two hand-operated members and intermediate connections for actuating the devices which connect the gears of the change-speed gearing to the driving and driven members with an independently-mounted indicator for one of said hand-operated members and connections between said indicator and the other member for moving said indicator. By providing an independently-mounted indicator for one of the hand-operated members and connections to the other member for operating the same the levers can be readily moved into the required relative positions to produce any desired speed. In the preferred form of this feature of my invention hereinafter specifically described the hand-operated members comprise two levers and the indicator comprises an indicator-plate pivotally mounted upon the pivotal axis of one lever and connected by means of a link to the other lever, the first-mentioned lever being provided with a pointer coöperating with the indicator-plate to indicate the proper position of such lever.

In addition to the features of invention above referred to my invention also consists in the devices, combinations, and arrangements of parts hereinafter described and claimed, the advantages of which will be obvious to those skilled in the art.

A preferred form of my invention is illustrated in the accompanying drawings, in which—

Figure 2:
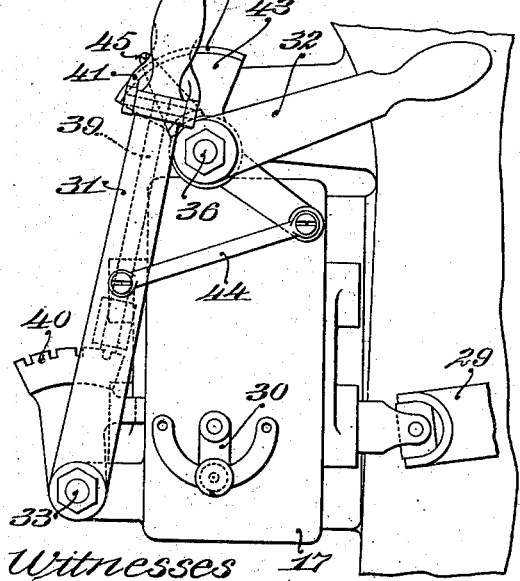
Figure 4:
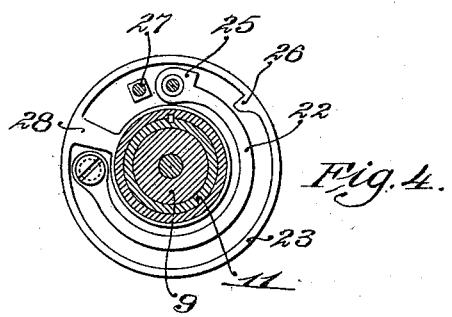
Figure 3:
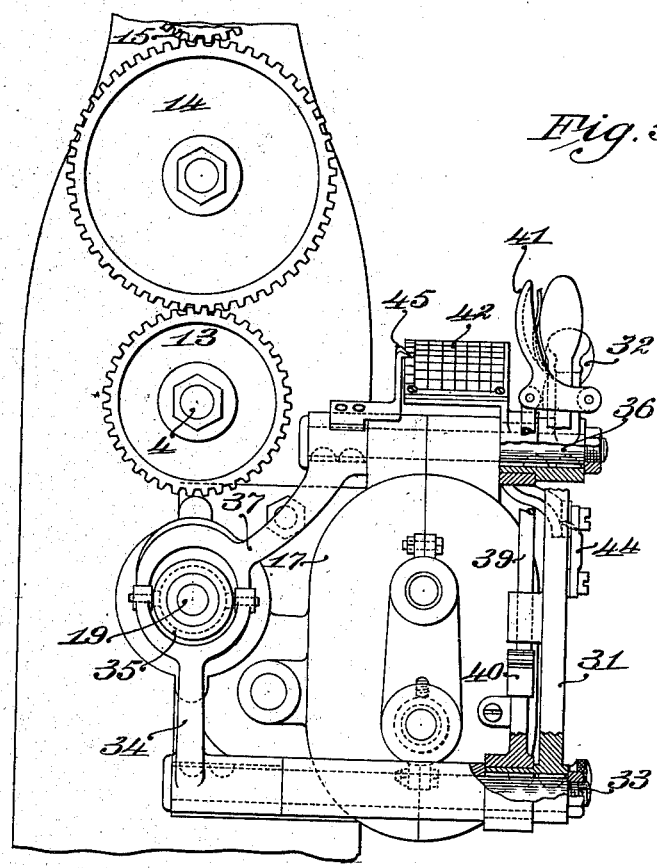
Figure 5:
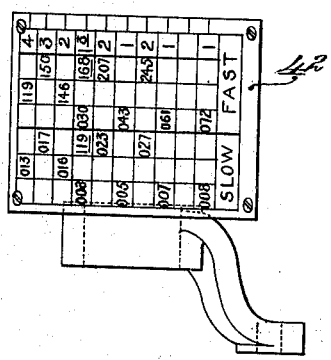

Figure 1 is a view in sectional elevation of a portion of a horizontal milling-machine provided with a change-feed mechanism embodying the same. Fig. 2 is a view in side elevation of a portion of the machine, illustrating the indicator-plate and the levers for actuating the devices for connecting the gears of the change-speed gearing to the driving and driven members. Fig. 3 is a view in end elevation of so much of the machine as is illustrated in Figs. 1 and 2 looking from the left of said figures. Fig. 4 is a detail sectional view on the line 4 4 of Fig. 1, and Fig. 5 is a plan view of the indicator-plate detached from the machine.

1 indicates the vertical column of the machine, the column being hollow and being provided with a horizontal cross-web 2 and with a vertical web 3, connecting the horizontal web 2 and the upper wall of the column. A shaft 4 is journaled in bearings in the rear wall of the column and in the vertical web 3, and upon this shaft is loosely mounted a sleeve 5, to which is secured a series of gears 6, which form a portion of the gears of the change-speed gearing. The gears of series 6 by being secured to the sleeve 5 are connected together so as to rotate in unison, and this series of gears I therefore term a series of "connected" gears. The remaining gears of the change-feed gearing comprise a series of gears 7, mounted to rotate independently of each other upon a shaft 8, arranged below and parallel with the shaft 4. Since the gears of series 7 are mounted to rotate independently of each other, I term this series of gears a series of "independent" gears. One end of the shaft 8 is journaled in a bearing in the rear wall of the column, and the other end is provided with a reduced portion, upon which is mounted a sleeve 9, so as to rotate loosely thereon, the sleeve being held from longitudinal movement with relation to the shaft by means of a nut 10 on the end of the reduced portion of the shaft. The sleeve 9 passes through and has a splined connection with a sleeve 11, mounted to rotate in a bearing in the vertical web 3. The sleeve 11 is rotated from a gear 12, secured to the inner end of the shaft 4 through mechanism which will be hereinafter described, and the shaft 4 is rotated from the power-shaft of the machine through a train of gearing comprising a gear 13, secured to the outer end of the shaft 4, a gear 14, meshing therewith, and a gear 15, meshing with the gear 14. The shaft 8 is mounted in its bearing so as to be movable longitudinally, and upon the outer end of the shaft is splined a gear 16, constituting a portion of the mechanism which is actuated by the shaft 8 and through which the feed-shaft of the machine is driven. The gear 16 is held in position by means of the surrounding portion of the casing 17, which incloses the gearing through which the movement of the shaft 8 is transmitted to the feed-shaft of the machine.

The sleeve 9 is actuated from the power-shaft of the machine and through the gears of the change-speed gearing, comprising the series of gears 6 and 7, drives the shaft 8. The sleeve 9 thus constitutes a driving member and the shaft 8 a driven member. On the sleeve 9 is mounted a spring-pressed locking-pawl 18, which can be brought into engagement with a slot in any one of the first four gears of series 7, counting from right to left, by moving the shaft 8 and sleeve 9 longitudinally. A rod 19 is mounted to slide axially of the shaft 8 and carries a spring-pressed locking-pawl 20, which extends through a slot in the shaft 8 and which can be brought into engagement with a slot in any one of the first four gears of series 7, counting from left to right, by moving the rod 19 longitudinally of the shaft. When one of the gears of series 7 is connected to the sleeve 9 and another gear of said series is connected to shaft 8, the shaft 8 is driven from the sleeve 9 through the gear of series 7 connected to the sleeve 9, the series of gears 6, and the gear of series 7 which is connected to shaft 8. It will be evident that the speed imparted to the shaft 8 will depend upon which of the gears of series 7 are connected to the sleeve 9 and shaft 8 and that by moving the locking-pawls 18 and 20 to engage the proper gears ten different speeds of the shaft 8 can be produced for each speed of the sleeve 9. In order to prevent the pawls 18 and 20 from engaging two adjacent gears simultaneously, separator-rings 21 are interposed between the hubs of the gears.

The construction so far described is the same in all essential particulars as that disclosed in my prior application hereinbefore referred to. In the embodiment of my present invention (illustrated in the drawings) the mechanism for transmitting the motion of gear 12 to the sleeve 9 comprises a cushioning-spring connection. This connection consists of a bent spring 22, (see Figs. 1 and 4,) one end of which is secured to a disk 23, fast upon the sleeve 11, and the other end of which is secured to a gear 24, meshing with the gear 12 and mounted loosely upon the hub of disk 23. The end of the spring which is attached to the gear 24 is provided with a projection 25, which when the spring is put under tension by rotating the gear 24 with relation to the disk 23 in one direction engages a projection 26 on the disk 23, so that after the spring is put under tension the disk 23 and the sleeve 9 are actuated positively from the gear 24. A block 27 is secured to or formed integral with the gear 24 and is arranged to contact with a projection 28 on the disk after the spring 22 has been put under tension by rotating the gear 24 with relation to the disk 23 in the opposite direction. A movement of the gear 24 with relation to the disk 23 in either direction, therefore, puts the spring 22 under tension and thereafter brings the gear positively into engagement with the disk 23. The tension of the spring 22 is such that during the operation of the machine the gear 24 positively engages the disk 23 so long as the locking-pawls 18 and 20 are in engagement with two of the gears of series 7. In changing from one speed to another either or both of the pawls 18 and 20 are moved and during such movement of either or both of the pawls the sleeve 9 and shaft 8 are disconnected. As soon as the sleeve 9 and shaft 8 are disconnected the spring 22 imparts an independent rotary movement to the sleeve 9, so that when the sleeve and shaft are again connected by the engagement of both pawls 18 and 20 with two of the gears of series 7 the sleeve 9 remains stationary until the spring 22 is put under tension, the shock or jar which would otherwise be produced when the shaft and sleeve were connected being taken up by the spring. The power which is transmitted by the change-speed gears when the machine is in operation is thus applied to the change-speed gearing gradually, and the gears and the locking-pawls are not subjected to injurious strains. Also the locking-pawls are allowed to seat themselves in the slots of the gears before the full power transmitted by the change-speed gearing is applied thereto, and thereby the locking-pawls are rendered more certain and reliable in operation. The gearing for transmitting the movement of the pinion 16 to the feed-shaft 29 is not illustrated in the drawings, as it forms no part of my invention and may be of any desired construction. The hand-lever 30 (illustrated in Fig. 2) is the lever by which the gearing which connects the gear 16 and the shaft 29 may be thrown out of operation or may be connected, so as to impart either of two different speeds to the shaft 29 for each speed of the gear 16 in a manner well known in the art. The shaft 8 and sleeve 9 are moved longitudinally and the rod 19 is moved longitudinally with relation to the shaft 8 to bring the locking-pawls 18 and 20 into engagement with the gears of series 7 by means of two hand-levers 31 and 32. (See Figs. 2 and 3.) The lever 31 is secured to one end of a rock-shaft 33, journaled in bearings projecting from the casing 17. To the other end of the shaft 33 a lever-arm 34 is secured, the upper free end of which is forked and provided with pins which engage a grooved collar 35, secured to or formed integral with the reduced outer end of the shaft 8. The hand-lever 32 is secured to one end of the rock-shaft 36, journaled in bearings extending upwardly from the casing 17. To the other end of the shaft 36 a lever-arm 37 is secured, which extends downwardly, the free end of the lever-arm being forked and provided with pins which engage a grooved collar 38, mounted to slide on the reduced outer end of the shaft 8 and connected to the rod 19 by means of a pin passing through a slot in the shaft. To lock the lever 31 in any one of the four positions to which it is moved in bringing the pawl 18 into engagement with the four right-hand gears of series 7, a locking-rod 39 is mounted to slide on the lever 31 and is arranged to engage the notches of a segmental plate 40, supported upon a cylindrical portion of the bearing for the rock-shaft 33 and secured to the casing 17. The upper end of the rod 39 is pivotally connected to a spring-pressed lever 41, pivotally mounted on the upper end of the lever 31 in convenient position to be grasped by the hand of the operator simultaneously with the lever 31. For indicating the position to which the lever 32 must be moved when the lever 31 is in each of these four positions in order to produce the different speeds of feed an indicator-plate 42 is provided, secured to or formed integral with a lever 43, pivotally mounted concentrically with the rock-shaft 36 upon a cylindrical portion of the bearing for the shaft. The plate 42 is curved concentrically with the axis of the shaft 36 and is moved to indicate the proper positions for the lever 32 in each position of the lever 31 by means of a link 44, connecting the lower end of the lever 43 with the lever 31. A pointer 45 is secured to the hub of the lever-arm 37 and is thus mounted to move with the lever 32 and coöperate with the indicator-plate in indicating the positions to which the lever 32 is to be moved.

The arrangement of the figures upon the indicator-plate will be apparent from an inspection of Fig. 5. In this figure the numerals in the upper horizontal column indicate the positions to which lever 32 must be moved for each position of the lever 31. As will be apparent from an inspection of Figs. 1 and 2, when the lever 31 is in the position indicated in Fig. 2 the lever 32 can be moved to any one of four different positions. These four positions of the lever 32 are indicated on the indicator-plate by the numerals 1 in the upper column. When the lever 31 is moved to bring the locking-rod 39 into engagement with the next notch to the left, the lever 32 can be moved to any one of three different positions, these three positions being indicated on the indicator-plate by the numerals 2 in the upper column. When the locking-rod 39 of the lever 31 is in the third notch of the plate 40, the lever 32 can be moved to either of two positions, and when it is in the last notch of the plate 40 the lever 32 can be moved into but one position, these positions being indicated on the indicator-plate by the numerals 3 and 4. The numerals in the next three columns below the upper column indicate the speeds obtained in each position of the levers 31 and 32 when the lever 30 is in the position in which the gearing connecting the gear 16 and feed-shaft 29 is connected to impart a fast speed of rotation to the feed-shaft, and the numerals in the three lower columns indicate the speeds obtained in each position of the levers 31 and 32 when the lever 30 is in the position in which the gearing connecting the gear 16 and the feed-shaft 29 is connected to impart a slow speed of rotation to the feed-shaft. It will be noted that both the numerals 1 and 3 appear in the same space in the upper column, the numeral 3 being underlined. The numerals in the lower columns which are underlined indicate the speeds obtained when the locking-rod 39 is in the third notch of the plate 40 and the lever 32 is moved to bring the pointer opposite the space containing the numerals 1 and 3, and the other numerals in the same vertical column indicate the speeds obtained when the lever 32 is moved to this position and the locking-rod 39 of the lever 31 is in engagement with the first notch of the plate 40.

Having thus indicated the nature and scope of my invention and having specifically described a preferred embodiment thereof, I claim as new and desire to secure by Letters Patent of the United States—

1. A change-feed mechanism, having, in combination, a driving member, a driven member, change-gearing intermediate said members, mechanism for actuating said driving member and mechanism actuated by said driven member, one of said mechanisms comprising a cushioning-spring connection arranged to impart an independent rotary movement to one of said members when said members are disconnected, substantially as described.

2. A change-feed mechanism, having, in combination, a driving member, a driven member, change-gearing intermediate said members, mechanism for actuating said driving member, and mechanism actuated by said driven member, one of said mechanisms comprising two members having a limited rotary movement independent of each other arranged to positively engage at the limit of such movement and a cushioning-spring connection between said members, substantially as described.

3. A change-feed mechanism, having, in combination, a driving member, a driven member, change-gearing intermediate said members, mechanism for actuating said driving member, and mechanism actuated by said driven member, one of said mechanisms comprising two members having a limited rotary movement independent of each other arranged to positively engage when one member is rotated with relation to the other in either direction, and a cushioning-spring connection between said members tending to hold said members separated and arranged to be put under tension when one member is rotated with relation to the other in either direction, substantially as described.

4. A change-feed mechanism, having, in combination, a driving member, a driven member, change-gearing intermediate said members, and mechanism for actuating said driving member, comprising a cushioning-spring connection arranged to impart an independent rotary movement to the driving member when disconnected from the driven member, substantially as described.

5. A change-feed mechanism, having, in combination, a driving member, a driven member, change-gearing intermediate said members, and mechanism for actuating said driving member, comprising two members having a limited rotary movement independent of each other arranged to positively engage at the limit of such movement and a cushioning-spring connection between said members, substantially as described.

6. A change-feed mechanism, having, in combination, a series of connected gears, a series of independent gears, a longitudinally-movable shaft upon which the independent gears are mounted to rotate, a sleeve thereon, means carried by the shaft and sleeve for connecting the gears thereto, a shaft upon which the connected gears are mounted loosely, means for rotating said shaft and mechanism connecting said shaft and sleeve comprising a loosely-mounted gear, a member rotating with the sleeve, and a cushioning-spring connection between said member and gear, substantially as described.

7. A change-feed mechanism, having, in combination, a driving member, a driven member, change-gearing intermediate said members, mechanism for actuating said driving member and mechanism actuated by said driven member, one of said mechanisms comprising two members mounted side by side having a limited rotary movement independent of each other and arranged to positively engage when one member is rotated with relation to the other in either direction, and a bent spring connecting said members tending to hold said members separated and arranged to be put under tension when one member is rotated with relation to the other in either direction, substantially as described.

8. A change-feed mechanism, having, in combination, a driving and a driven member, change-gearing intermediate said members, devices for connecting the gears of the change-gearing to said members to produce a plurality of different speeds of the driven member for a given speed of the driving member, two levers and intermediate connections for actuating said devices, a pivotally-mounted indicator for one of said levers, and a link connecting the indicator to the other lever, substantially as described.

9. A change-feed mechanism, having, in combination, a driving and a driven member, change-gearing intermediate said members, devices for connecting the gears of the change-gearing to said members to produce a plurality of different speeds of the driven member for a given speed of the driving member, two hand-operated members and intermediate connections for actuating said devices, an independently-mounted indicator for one of said members, and connections between said indicator and the other member for moving the same, substantially as described.

10. A change-feed mechanism, having, in combination, a driving and a driven member, change-gearing intermediate said members, devices for connecting the gears of the change-gearing to said members to produce a plurality of different speeds of the driven member for a given speed of the driving member, two hand-operated members and intermediate connections for actuating said devices, an independently-mounted indicator-plate for one of said members, a pointer coöperating therewith movable with said member, and connections between said indicator-plate and the other member for moving the same, substantially as described.

11. A change-feed mechanism, having, in combination, a driving and a driven member, change-gearing intermediate said members, devices for connecting the gears of the change-gearing to said members to produce a plurality of different speeds of the driven member for a given speed of the driving member, two levers and intermediate connections for actuating said devices, an indicator-plate for one of said levers pivotally mounted upon the pivotal axis of said lever, a pointer coöperating therewith movable with said lever, and a link connecting the indicator-plate to the other, substantially as described.

12. A change-feed mechanism, having, in combination, a series of connected gears, a series of independent gears, a longitudinally-movable shaft upon which the series of independent gears are mounted, a sleeve thereon, devices carried by the shaft and sleeve for connecting the gears thereto, one of said devices being movable longitudinally of the shaft and sleeve, a lever and connections for moving the shaft and sleeve longitudinally, a lever and connections for moving said movable device, an indicator-plate for one of said levers pivotally mounted upon the pivotal axis of said lever, a pointer coöperating therewith movable with said lever, and a link connecting the indicator-plate to the other lever, substantially as described.

In testimony whereof I affix my signature in presence of two witnesses.

JOHN EDGAR.

Witnesses:
ALFRED H. HILDRETH,
HENRIETTA C. RAYNER.